(12) United States Patent
Goto

(10) Patent No.: US 9,921,059 B2
(45) Date of Patent: Mar. 20, 2018

(54) MEASUREMENT VALUE CORRECTION METHOD, COMPUTER-READABLE RECORDING MEDIUM, AND MEASUREMENT DEVICE

(71) Applicant: Mitutoyo Corporation, Kanagawa (JP)

(72) Inventor: Tomonori Goto, Hokkaido (JP)

(73) Assignee: MITUTOYO CORPORATION, Kawasaki (JP)

( * ) Notice: Subject to any disclaimer, the term of this patent is extended or adjusted under 35 U.S.C. 154(b) by 378 days.

(21) Appl. No.: 14/927,847

(22) Filed: Oct. 30, 2015

(65) Prior Publication Data
US 2016/0131477 A1 May 12, 2016

(30) Foreign Application Priority Data

Nov. 7, 2014 (JP) ................................ 2014-227235
Nov. 7, 2014 (JP) ................................ 2014-227236

(51) Int. Cl.
*G01C 17/38* (2006.01)
*G01B 21/04* (2006.01)
*G01B 5/20* (2006.01)
*G06F 11/30* (2006.01)

(52) U.S. Cl.
CPC ............. *G01B 21/045* (2013.01); *G01B 5/20* (2013.01); *G01B 21/042* (2013.01)

(58) Field of Classification Search
CPC .................................................... G01B 21/045
See application file for complete search history.

(56) References Cited

U.S. PATENT DOCUMENTS

| 5,150,314 | A | * | 9/1992 | Garratt | ..................... | G01B 7/28 |
| | | | | | | 33/551 |
| 7,383,143 | B2 | * | 6/2008 | Goto | ........................ | G01B 5/20 |
| | | | | | | 702/94 |
| 7,539,586 | B2 | | 5/2009 | Goto et al. | | |

FOREIGN PATENT DOCUMENTS

| JP | 2727067 | 3/1998 |
| JP | 3215325 | 10/2001 |
| JP | 5155533 | 3/2013 |
| JP | 5183884 | 4/2013 |

* cited by examiner

*Primary Examiner* — Phuong Huynh
(74) *Attorney, Agent, or Firm* — Rankin, Hill & Clark LLP

(57) ABSTRACT

A measurement value correction method according to the present invention is a measurement value correction method for correcting a measurement value obtained by tracing a surface of a work piece with a stylus, and including a step of preparing a plurality of work pieces made from same design data, a step of adopting one of the work pieces as a master work piece and obtaining a reference measurement value with the stylus, a step of obtaining calibration data based on a difference between the reference measurement value and the design data, a step of adopting one of the plurality of work pieces other than the master work piece as a measurement target work piece and obtaining a target measurement value with the stylus, and a step of obtaining a corrected measurement value by correcting the target measurement value by using the calibration data.

24 Claims, 11 Drawing Sheets

MEASUREMENT VALUE CORRECTION METHOD, COMPUTER-READABLE RECORDING MEDIUM, AND MEASUREMENT DEVICE

CROSS-REFERENCE TO RELATED APPLICATION

This non-provisional application claims priority under 35 U.S.C. § 119(a) from Japanese Patent Application No. 2014-227235, filed on Nov. 7, 2014, and Japanese Patent Application No. 2014-227236, filed on Nov. 7, 2014, the entire contents of which are incorporated herein by reference.

BACKGROUND

Technical Field

The present invention relates to a measurement value correction method and a measurement device for correcting a measurement value obtained by tracing a surface of a work piece with a stylus, and relates to a computer-readable recording medium storing a measurement value correction program.

Related Art

A shape measurement machine for obtaining a measurement value on the basis of displacement of a stylus obtained by tracing a surface of a work piece with a stylus is known as a measurement device for measuring a shape of a surface of a work piece. For example, a pivot-type shape measurement machine with which a stylus makes an arc motion about a fulcrum relatively moves the work piece and the stylus in a predetermined direction while the stylus is caused to be in contact with the surface of the work piece, and obtains a shape (height) of the surface of the work piece from the position along the movement direction at that occasion and the displacement of the stylus.

In this case, in the shape measurement machine using the pivot-type stylus, it is necessary to correct the measurement value in view of the arc motion of the stylus. For example, the specifications of Japanese Patent No. 2727067, Japanese Patent No. 5183884, Japanese Patent No. 5155533, Japanese Patent No. 3215325, and U.S. Pat. No. 5,150,314 disclose a correction method of a measurement device using a pivot-type stylus. In any of the techniques, an ideal spherical surface and a cylindrical surface are used as a reference of a calibration.

SUMMARY OF THE INVENTION

In recent years, in an industrial product such as a lens, a demand for increasing the precision in an outline measurement of a work piece is increasing. For example, in a case where the outline of the aspherical lens is measured, there is a product where the shape error with respect to the design value is several dozen nanometers or less, and the sag amount corresponds to the dynamic range of the measurement device. In order to perform outline measurement of such work piece, a measurement device needs calibration using a reference sphere of which sphericity is extremely high.

It is an object of the present invention to provide a measurement value correction method, a computer-readable recording medium storing a measurement value correction program, and a measurement device capable of obtaining a highly precise measurement result from an optimum correction with regard to a measurement value.

A measurement value correction method according to an embodiment of the present invention is a measurement value correction method for correcting a measurement value obtained by tracing a surface of a work piece with a stylus, the measurement value correction method including: a step of preparing a plurality of work pieces made from same design data; a step of adopting one of the work pieces as a master work piece and obtaining a reference measurement value with the stylus; a step of obtaining calibration data on the basis of a difference between the reference measurement value and the design data; a step of adopting one of the plurality of work pieces other than the master work piece as a measurement target work piece and obtaining a target measurement value with the stylus; and a step of obtaining a corrected measurement value by correcting the target measurement value by using the calibration data.

According to such configuration, a reference measurement value is obtained by adopting one of a plurality of work pieces made from same design data as the master work piece, and therefore, calibration data optimum for the shape of the measurement target work piece made from the same design data as the master work piece can be obtained.

According to the measurement value correction method, the stylus may be a pivot-type making an arc motion about a fulcrum. According to such configuration, calibration data suitable for operation of the pivot-type stylus can be obtained.

According to the measurement value correction method, a surface of the work piece may be an aspherical surface. According to such configuration, calibration data optimum for the measurement of the aspherical surface can be obtained.

According to the measurement value correction method, in the step of obtaining the calibration data, a parameter of a model expression for correcting a measurement value with the stylus may be fitted from a relationship between the design data and a correction value for the reference measurement value based on the model expression, and in the step of obtaining the corrected measurement value, the corrected measurement value may be obtained by correcting the target measurement value by using the model expression in which the parameter is fitted.

According to such configuration, the calibration data can be included in the model expression for correcting the measurement value with the stylus, and a highly accurate corrected measurement value can be obtained by correcting the target measurement value by using the model expression.

A non-transitory computer-readable recording medium according to the embodiment of the present invention stores the measurement value correction program. The measurement value correction program is a measurement value correction program for correcting a measurement value obtained by tracing a surface of a work piece with a stylus, wherein the program causes a computer to function as: means of obtaining a reference measurement value obtained by measuring, with the stylus, one of a plurality of work pieces made from same design data as a master work piece; means of calculating calibration data based on a difference between the reference measurement value and the design data; means of adopting one of the plurality of work pieces other than the master work piece as a measurement target work piece, and obtaining a target measurement value obtained by measuring the measurement target work piece with the stylus; and means of calculating a corrected measurement value by correcting the target measurement value by using the calibration data.

According to such configuration, the reference measurement value is obtained by adopting one of the multiple work pieces made from the same design data as the master work piece, and therefore, the computer can calculate the calibration data optimum for the shape of the measurement target work piece made from the same design data as the master work piece.

According to the measurement value correction program stored in the computer-readable recording medium, the stylus may be a pivot-type making an arc motion about a fulcrum. According to such configuration, calibration data suitable for operation of the pivot-type stylus can be obtained.

According to the measurement value correction program stored in the computer-readable recording medium, a surface of the work piece maybe an aspherical surface. According to such configuration, the computer can calculate calibration data optimum for the measurement of the aspherical surface.

According to the measurement value correction program stored in the computer-readable recording medium, in the means of obtaining the calibration data, a parameter of a model expression for correcting a measurement value with the stylus may be fitted from a relationship between the design data and a correction value for the reference measurement value based on the model expression, and in the means of obtaining the corrected measurement value, the corrected measurement value may be obtained by correcting the target measurement value by using the model expression in which the parameter is fitted.

According to such configuration, the calibration data can be included in the model expression for correcting the measurement value with the stylus, and the computer can obtain a highly accurate corrected measurement value by correcting the target measurement value by using the model expression.

A measurement device according to an embodiment of the present invention includes: a measurement unit configured to obtain a measurement value obtained by tracing a surface of a work piece with a stylus; a calibration data obtaining unit configured to obtain calibration data; and a correction unit configured to correct the measurement value obtained by the measurement unit with the calibration data, wherein the calibration data obtaining unit includes: a reference value obtaining unit configured to adopt one of a plurality of work pieces made from same design data as a master work piece and obtaining a reference measurement value with the stylus; and a calculation unit configured to calculate the calibration data on the basis of a difference between the reference measurement value obtained by the reference value obtaining unit and the design data, and wherein the correction unit uses the calibration data to correct a target measurement value obtained by adopting one of the plurality of work pieces other than the master work piece as a measurement target work piece and measuring the measurement target work piece with the stylus.

According to such configuration, the reference measurement value is obtained by adopting one of the multiple work pieces made from the same design data as the master work piece, and therefore, the calibration data optimum for the shape of the measurement target work piece made from the same design data as the master work piece can be obtained.

According to the measurement device, the stylus may be a pivot-type making an arc motion about a fulcrum. According to such configuration, calibration data suitable for operation of the pivot-type stylus can be obtained.

According to the measurement device, a surface of the work piece may be an aspherical surface. According to such configuration, calibration data optimum for the measurement of the aspherical surface can be obtained.

According to the measurement device, the calculation unit may fit a parameter of a model expression for correcting a measurement value with the stylus from a relationship between the design data and a correction value for the reference measurement value based on the model expression, and the correction unit may correct the target measurement value by using the model expression in which the parameter is fitted.

According to such configuration, the calibration data can be included in the model expression for correcting the measurement value with the stylus, and a highly accurate corrected measurement value can be obtained by correcting the target measurement value by using the model expression.

A measurement value correction method according to another embodiment is a measurement value correction method for correcting a measurement value obtained by tracing a surface of a work piece with a stylus of a measurement device, the measurement value correction method including: a step of preparing a plurality of work pieces made from same design data; a step of adopting one of the plurality of work pieces as a master work piece and causing a first measurement device to measure the master work piece to obtain a first reference measurement value; a step of obtaining calibration data on the basis of a difference between the first reference measurement value and the design data; a step of causing a second measurement device of which measurement accuracy is higher than the first measurement device to measure the master work piece to obtain a second reference measurement value; a step of obtaining difference data which is a difference between a value obtained by correcting the first reference measurement value by using the calibration data and the second reference measurement value; a step of adopting one of the plurality of work pieces other than the master work piece as a measurement target work piece and causing the first measurement device to measure the measurement target work piece to obtain a target measurement value; and a step of subtracting the difference data from a value obtained by correcting the target measurement value by using the calibration data to obtain a corrected measurement value.

According to such configuration, the reference measurement value is obtained by adopting one of the multiple work pieces made from the same design data as the master work piece, and therefore, the calibration data optimum for the shape of the measurement target work piece made from the same design data as the master work piece can be obtained. Further, the second measurement device of which measurement accuracy is higher than the first measurement device measures the master work piece, and the difference data from the measurement correction value of the master work piece provided by the first measurement device is obtained, and therefore, the measurement can be performed with the same level of measurement accuracy as the second measurement device by removing the error caused by the first measurement device.

According to the measurement value correction method, the stylus may be a pivot-type making an arc motion about a fulcrum. According to such configuration, calibration data suitable for operation of the pivot-type stylus can be obtained.

According to the measurement value correction method, a surface of the work piece may be an aspherical surface.

According to such configuration, calibration data optimum for the measurement of the aspherical surface can be obtained.

According to the measurement value correction method, in the step of obtaining the calibration data, a parameter of a model expression for correcting a measurement value with the stylus may be fitted from a relationship between the design data and a correction value for the first reference measurement value based on the model expression to derive a first parameter, and in the step of obtaining the corrected measurement value, the target measurement value may be corrected by using the model expression in which the first parameter is applied.

According to such configuration, the calibration data can be included in the model expression for correcting the measurement value with the stylus, and a highly accurate corrected measurement value can be obtained by correcting the target measurement value by using the model expression.

A non-transitory computer-readable recording medium according to another embodiment of the present invention stores a measurement value correction program. The measurement value correction program is a measurement value correction program for correcting a measurement value obtained by tracing a surface of a work piece with a stylus of a measurement device, and the program causes a computer to function as: means of adopting one of the plurality of work pieces made from same design data as a master work piece and causing a first measurement device to measure the master work piece to obtain a first reference measurement value; means of calculating calibration data on the basis of a difference between the first reference measurement value and the design data; means of obtaining second reference measurement value obtained by causing a second measurement device of which measurement accuracy is higher than the first measurement device to measure the master work piece; means of obtaining difference data which is a difference between a value obtained by correcting the first reference measurement value by using the calibration data and the second reference measurement value; means of adopting one of the plurality of work pieces other than the master work piece as a measurement target work piece and causing the first measurement device to measure the measurement target work piece to obtain a target measurement value; and means of subtracting the difference data from a value obtained by correcting the target measurement value by using the calibration data to obtain a corrected measurement value.

According to such configuration, the reference measurement value is obtained by adopting one of the multiple work pieces made from the same design data as the master work piece, and therefore, the computer can calculate the calibration data optimum for the shape of the measurement target work piece made from the same design data as the master work piece. Further, the second measurement device of which measurement accuracy is higher than the first measurement device measures the master work piece, and the difference data from the measurement correction value of the master work piece provided by the first measurement device is obtained, and therefore, the measurement can be performed with the same level of measurement accuracy as the second measurement device by removing the error caused by the first measurement device.

According to the measurement value correction program stored in the computer-readable recording medium, the stylus may be a pivot-type making an arc motion about a fulcrum. According to such configuration, calibration data suitable for operation of the pivot-type stylus can be obtained.

According to the measurement value correction program stored in the computer-readable recording medium, a surface of the work piece may be an aspherical surface. According to such configuration, the computer can calculate calibration data optimum for the measurement of the aspherical surface.

According to the measurement value correction program stored in the computer-readable recording medium, in the step of obtaining the calibration data, a parameter of a model expression for correcting a measurement value with the stylus may be fitted from a relationship between the design data and a correction value for the first reference measurement value based on the model expression to derive a first parameter, and in the means of obtaining the corrected measurement value, the target measurement value may be corrected by using the model expression in which the first parameter is applied.

According to such configuration, the calibration data can be included in the model expression for correcting the measurement value with the stylus, and the computer can obtain a highly accurate corrected measurement value by correcting the target measurement value by using the model expression.

A measurement device according to another embodiment includes: a measurement unit configured to obtain a measurement value obtained by tracing a surface of a work piece with a stylus; a calibration data obtaining unit configured to obtain calibration data; and a correction unit configured to correct the measurement value obtained by the measurement unit with the calibration data, wherein the calibration data obtaining unit includes: a first reference value obtaining unit configured to adopt one of a plurality of work pieces made from same design data as a master work piece and obtaining a first reference measurement value measured by a first measurement device; a second reference value obtaining unit configured to obtain a second reference measurement value obtained by causing a second measurement device of which measurement accuracy is higher than the first measurement device to measure the master work piece; a first calculation unit configured to calculate calibration data on the basis of a difference between the first reference measurement value and the design data; and a second calculation unit configured to calculate difference data which is a difference between a value obtained by correcting the first reference measurement value by using the calibration data and the second reference measurement value, wherein the correction unit uses the calibration data to correct a target measurement value obtained by adopting one of the plurality of work pieces other than the master work piece as a measurement target work piece and causing the first measurement device to measure the measurement target work piece, and subtracts the difference data from the corrected value to obtain a corrected measurement value.

According to such configuration, the reference measurement value is obtained by adopting one of the multiple work pieces made from the same design data as the master work piece, and therefore, the calibration data optimum for the shape of the measurement target work piece made from the same design data as the master work piece can be obtained. Further, the second measurement device of which measurement accuracy is higher than the first measurement device measures the master work piece, and the difference data from the measurement correction value of the master work piece provided by the first measurement device is obtained, and therefore, the measurement can be performed with the same level of measurement accuracy as the second measurement device by removing the error caused by the first measurement device.

According to the measurement device, the stylus may be a pivot-type making an arc motion about a fulcrum. According to such configuration, calibration data suitable for operation of the pivot-type stylus can be obtained.

According to the measurement device, a surface of the work piece may be an aspherical surface. According to such configuration, calibration data optimum for the measurement of the aspherical surface can be obtained.

According to the measurement device, the first calculation unit may fit a parameter of a model expression for correcting a measurement value with the stylus from a relationship between the design data and a correction value for the first reference measurement value based on the model expression to derive a first parameter, and the correction unit may correct the target measurement value by using the model expression in which the first parameter is applied.

According to such configuration, the calibration data can be included in the model expression for correcting the measurement value with the stylus, and a highly accurate corrected measurement value can be obtained by correcting the target measurement value by using the model expression.

DETAILED DESCRIPTION OF THE EMBODIMENTS

Figure 1A:
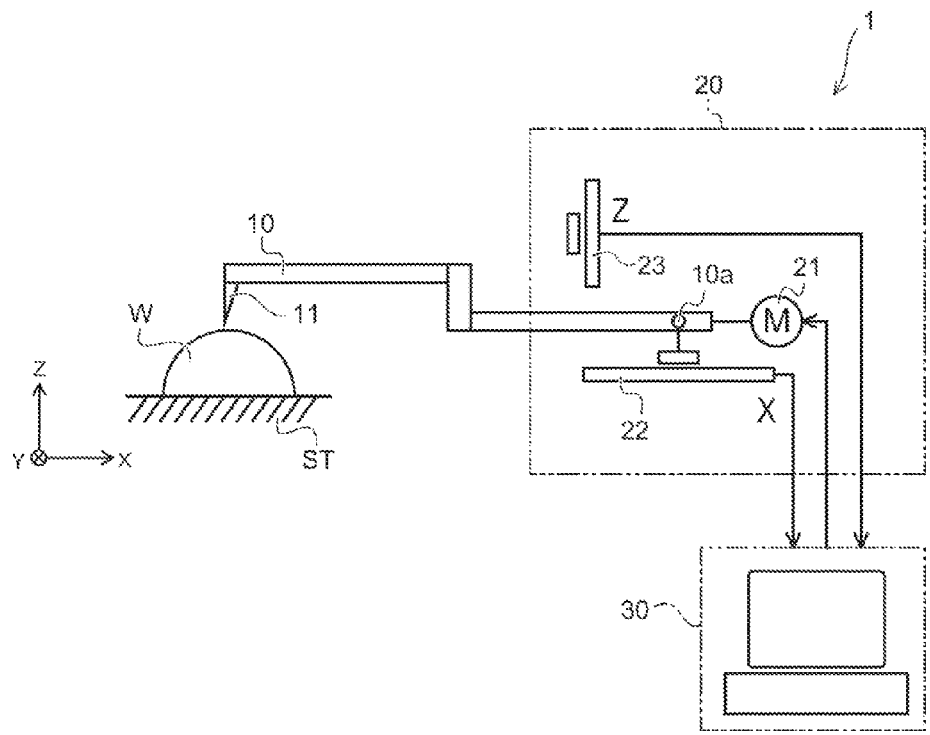
FIGS. 1A and 1B are schematic diagrams illustrating an example of a configuration of a measurement device according to the present embodiment.

Hereinafter, embodiments of the present invention will be explained on the basis of drawings. In the following explanation, the same members are denoted with the same reference numerals, and explanations about members that have been explained once are omitted as necessary.

First Embodiment

Measurement Device

Figure 1B:
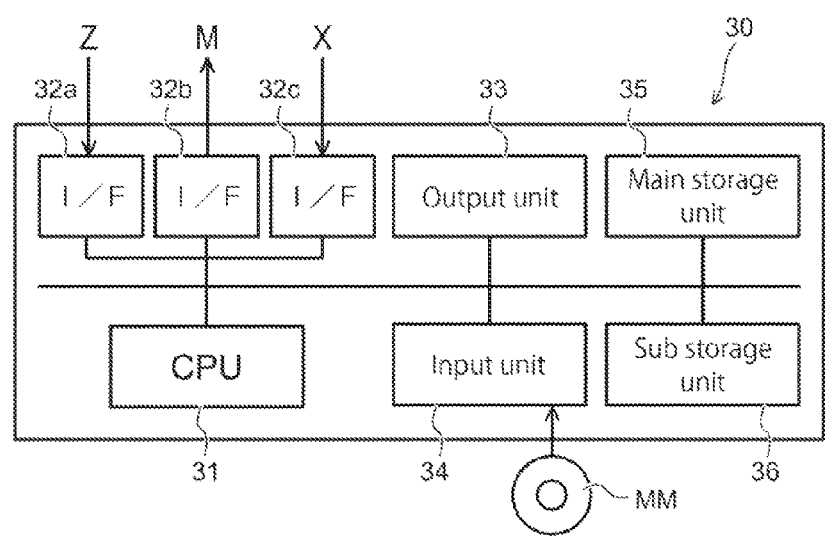

FIGS. 1A and 1B are schematic diagrams illustrating an example of a configuration of a measurement device according to the present embodiment. FIG. 1A illustrates a configuration diagram of a measurement device 1. FIG. 1B illustrates a block diagram of a computer 30.

As shown in FIG. 1A, the measurement device 1 according to the present embodiment is a device for measuring a position (height) of a surface of a work piece W by tracing the surface of the work piece W, i.e., a target object of measurement, with a stylus 10. The measurement device 1 includes a stylus 10, a detection unit 20, and a computer 30. The work piece W is disposed on the stage ST. The work piece W and the stylus 10 are arranged to be relatively movable in a direction. With this relative movement, the stylus 10 traces the surface of the work piece W. In the present embodiment, the relative movement direction of the work piece W and the stylus 10 is defined as an X axis direction. A direction perpendicular to the X axis (a direction perpendicular to a reference surface of the stage ST) is defined as a Z axis direction. In the measurement device 1, the work piece W is fixed to the stage ST, and the stylus 10 moves in the X axis direction.

The stylus 10 is of a pivot-type that makes an arc motion about a predetermined fulcrum 10a. The arc motion of the stylus 10 is made along the XZ flat surface. The detection unit 20 includes a motor 21 serving as a driving source for moving the stylus 10 in the X axis direction, an X axis detection unit 22 for detecting the position of the stylus 10 in the X axis direction, and a Z axis detection unit 23 for detecting the position of the stylus 10 in the Z axis direction.

The motor 21 moves the stylus 10 in the X axis direction by giving a driving force to a driving mechanism (not shown) in accordance with a command from the computer 30. The X axis detection unit 22 detects the position of the stylus 10 along the X axis which moves in the X axis direction during measurement, and sends the position to the computer 30. A measurement piece 11 is provided at the end of the stylus 10. When the stylus 10 is caused to move in the X axis direction, the measurement piece 11 advances while being in contact with the surface of the work piece W.

The Z axis detection unit 23 detects the position of the stylus 10 in the Z axis which makes an arc motion to follow the surface shape of the work piece W during measurement, and sends the position to the computer 30. According to such configuration, the measurement device 1 can obtain the height (the position of the Z axis direction) of the measurement piece 11, along the trace line, which is in contact with the surface of the work piece W and which corresponds to the position of the stylus 10 along the X axis. Accordingly, the surface shape of the work piece W along the trace line can be obtained. For example, the three-dimensional shape of the surface of the work piece W can also be obtained by performing similar measurement by moving the stage ST in the Y axis direction (a direction perpendicular to the X axis direction and the Z axis direction).

As shown in FIG. 1B, the computer 30 includes a CPU (Central Processing Unit) 31, interfaces 32a to 32c, an output unit 33, an input unit 34, a main storage unit 35, and a sub storage unit 36.

The CPU 31 controls each unit by executing various kinds of programs. The interfaces 32a to 32c are portions for inputting and outputting information to and from the detection unit 20. In the present embodiment, detection information is retrieved from the Z axis detection unit 23 of the detection unit 20 via the interface 32a. In addition, a command is given to the motor 21 of the detection unit 20 via the interface 32b. In addition, detection information is retrieved from the X axis detection unit 22 of the detection unit 20 via the interface 32c. It should be noted that the computer 30 may be connected to a LAN (Local Area Network) and a WAN (Wide Area Network) via an interface not shown.

The output unit 33 is a portion for outputting a result processed by the computer 30. For example, a display and a printer, not shown, are used as the output unit 33. The input unit 34 is a portion for receiving information from an operator. For example, a keyboard, a joy stick, and a mouse, not shown, are used as the input unit 34. The input unit 34 includes a function for reading information recorded in a memory medium MM.

For example, RAM (Random Access Memory) is used as the main storage unit 35. A part of the sub storage unit 36 may be used as a part of the main storage unit 35. For example, HDD (Hard disk drive) and an SSD (Solid State Drive) are used as the sub storage unit 36. The sub storage unit 36 may be an external storage device connected via a network.

Figure 2:
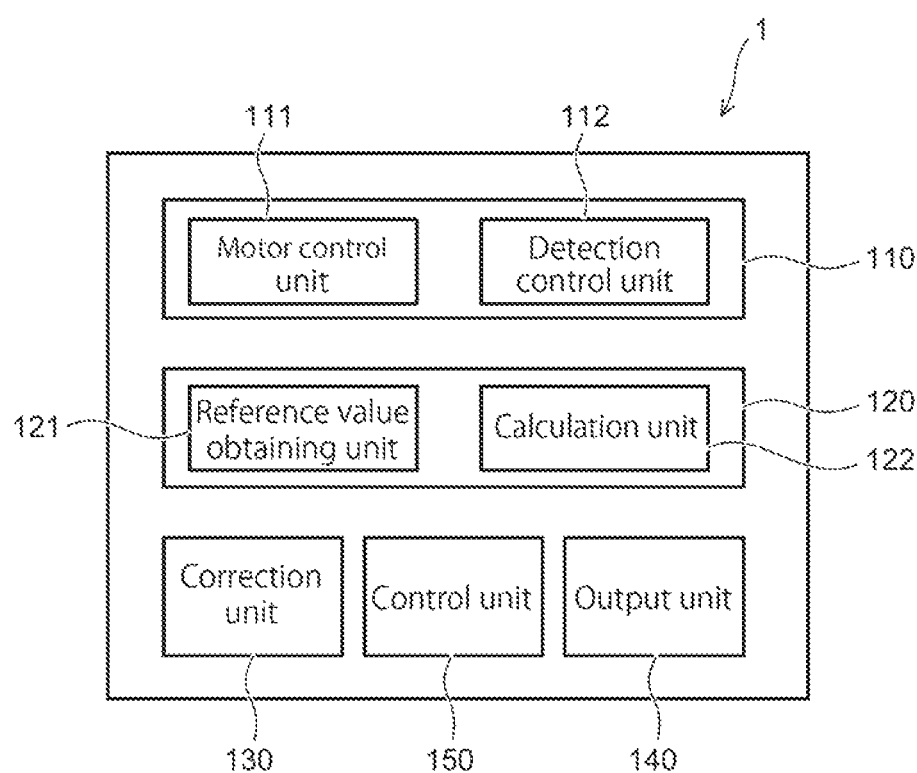
FIG. 2 is a functional block diagram illustrating a measurement device according to the present embodiment.

FIG. 2 is a functional block diagram illustrating a measurement device according to the present embodiment.

The functional blocks of the measurement device 1 include a measurement unit 110, a calibration data obtaining unit 120, a correction unit 130, an output unit 140, and a control unit 150. Among them, the measurement unit 110 includes a motor control unit 111 and a detection control unit 112, and the calibration data obtaining unit 120 includes a reference value obtaining unit 121 and a calculation unit 122.

The motor control unit 111 of the measurement unit 110 gives a command for controlling rotation of the motor 21. The detection control unit 112 controls the X axis detection unit 22 and the Z axis detection unit 23 to obtain the coordinate value in the X axis and the coordinate value in the Z axis (measurement values) sent therefrom.

The calibration data obtaining unit 120 is a portion for obtaining calibration data for correcting the measurement value obtained by the measurement unit 110. One of multiple work pieces W made from the same design data is adopted as the master work piece, and the reference value obtaining unit 121 of the calibration data obtaining unit 120 obtains a reference measurement value obtained by measuring the surface of this master work piece with the stylus 10. The calculation unit 122 of the calibration data obtaining unit 120 calculates calibration data on the basis of a difference between the design data and the reference measurement value obtained by the reference value obtaining unit 121.

The correction unit 130 is a portion for correcting the measurement value obtained by the measurement unit 110 with calibration data obtained by the calibration data obtaining unit 120, and calculating the corrected measurement value.

The output unit 140 is a portion for outputting a measurement result. The control unit 150 is a portion for controlling the measurement unit 110, the calibration data obtaining unit 120, the correction unit 130, and the output unit 140.

In the measurement device 1 having such functional blocks, a measurement result involving less error can be obtained by correcting the measurement value of the surface of the work piece W with the calibration data. In particular, a reference measurement value is obtained by using, as the master work piece, one of multiple work pieces W generated from the same design data, and therefore, the calibration data optimum for the shape of another work piece W made from the same design data as the master work piece can be obtained. Therefore, a highly accurate measurement result can be obtained by correcting the measurement value on the basis of the optimum calibration data.

[Measurement Value Correction Method]

Subsequently, a correction method of a measurement value including acquisition of calibration data will be explained.

In this case, a method for correcting a measurement value using the measurement device 1 will be explained as an example.

Figure 3A:
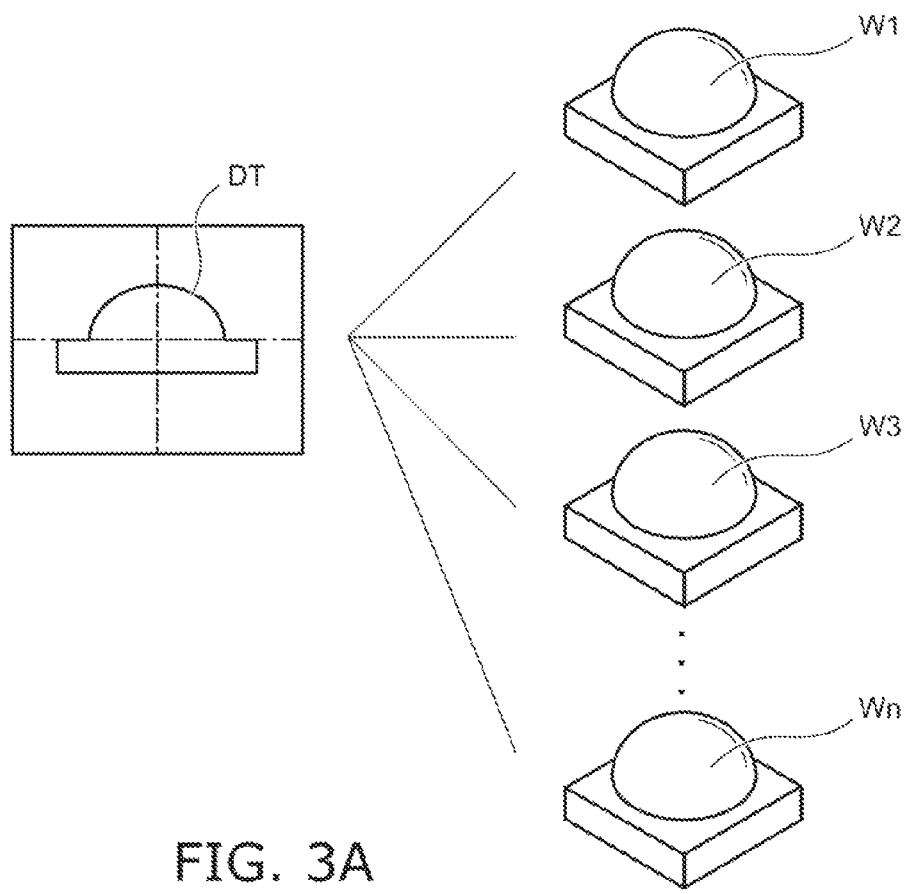
FIGS. 3A and 3B are figures explaining a measurement value correction method according to the present embodiment.

First, as shown in FIG. 3A, multiple work pieces W1, W2, W3, . . . , Wn made from the same design data DT are prepared. Subsequently, any one of multiple made work pieces W1, W2, W3, . . . , Wn is adopted as the master work piece. In this case, for example, the work piece W1 is adopted as the master work piece. Then, the measurement unit 110 of the measurement device 1 measures the surface of the master work piece, and obtains the reference measurement value. The reference measurement value is obtained by the reference value obtaining unit 121.

Figure 3B:
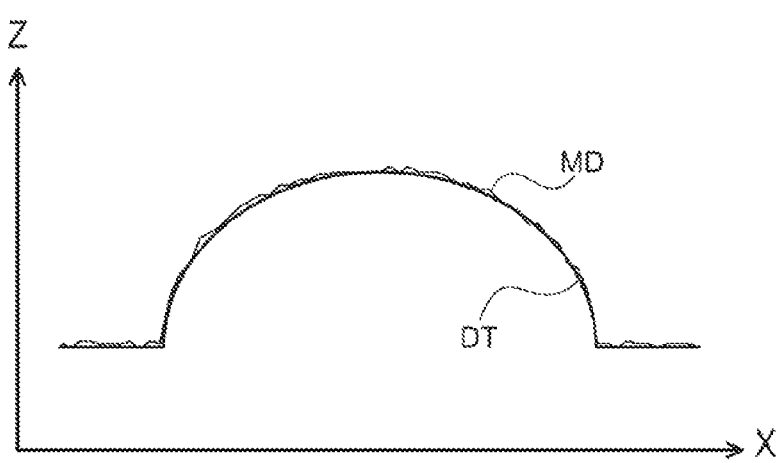

Subsequently, the calibration data are obtained on the basis of the difference between the reference measurement value and the design data DT. The calibration data are calculated by the calculation unit 122 of the calibration data obtaining unit 120. FIG. 3B is a figure illustrating an example of the difference between the design data DT and the measurement value MD of the master work piece. In FIG. 3B, the horizontal axis represents a coordinate in the X axis direction, the vertical axis is a coordinate in the Z axis direction. The measurement values MD of the master work piece are obtained as the Z axis coordinates respectively corresponding to multiple X axis coordinates. The calculation unit 122 derives a difference between the value of each measurement value MD in the Z axis coordinate and the Z axis coordinate value of the design data DT corresponding to the measurement value MD in question, and calculates parameters of the model function by, for example, least-square method. The parameters of this model function are the calibration data.

Subsequently, the measurement unit 110 adopts, as a measurement target work piece, the work pieces W2, W3, . . . , Wn other than the master work piece of the multiple work pieces W1, W2, W3, . . . , Wn, and obtains the measurement value of the measurement target work piece (target measurement value) with the stylus 10.

Subsequently, the correction unit 130 corrects the target measurement value by using the calibration data. More specifically, the corrected measurement value is derived by the model function applied with the parameters derived in advance from the coordinate values of the target measurement values in the Z axis direction. In such measurement value correction method, the target measurement values are corrected with the calibration data derived with the master work piece made from the same design data DT, and therefore, a highly accurate measurement result can be obtained with the calibration data optimum for the shape of the measurement target work piece.

For example, in a case where the design data DT are a spherical surface, one of the multiple work pieces W1, W2, W3, . . . , Wn made from the design data DT is adopted as the master work piece, and the calibration data are obtained. The measurement values of the measurement target work piece other than the master work piece made from the same design data DT is corrected with the calibration data. The measurement target work piece and the master work piece are made from the same design data DT, and therefore, the calibration data derived from that master work piece are calibration data that are also optimum for the measurement target work piece made from the same design data DT.

The present embodiment is particularly effective in a case where the design data DT are an aspherical surface. More specifically, in a case where the design data DT are an aspherical surface, in general, a highly accurate spherical surface master work piece is used to obtain the calibration data. However, it is difficult to prepare a highly accurate spherical surface master work piece. With regard to this feature, in the present embodiment, one of the multiple work pieces W1, W2, W3, ..., Wn made from the design data DT of the same aspherical surface is used as the master work piece, and therefore, it is not necessary to separately prepare a highly accurate spherical surface master work piece. In addition, one of the multiple work pieces W1, W2, W3, ..., Wn made from the design data DT of the same aspherical surface is adopted as the master work piece, and the calibration data are obtained, and therefore, a highly accurate measurement result can be obtained with correction based on the calibration data optimum for the measurement target work piece.

In a case where the master work piece is selected from the multiple work pieces W1, W2, W3, ..., Wn made from the same design data DT of the aspherical surface, one of the multiple work pieces W1, W2, W3, ..., Wn that has the minimum error with respect to the design data DT is preferably adopted as the master work piece. Accordingly, more highly accurate correction can be performed.

[Pivot-Type Stylus]

Hereinafter, a specific acquisition of calibration data with the measurement device 1 using the pivot-type stylus 10 will be explained.

Figure 4:
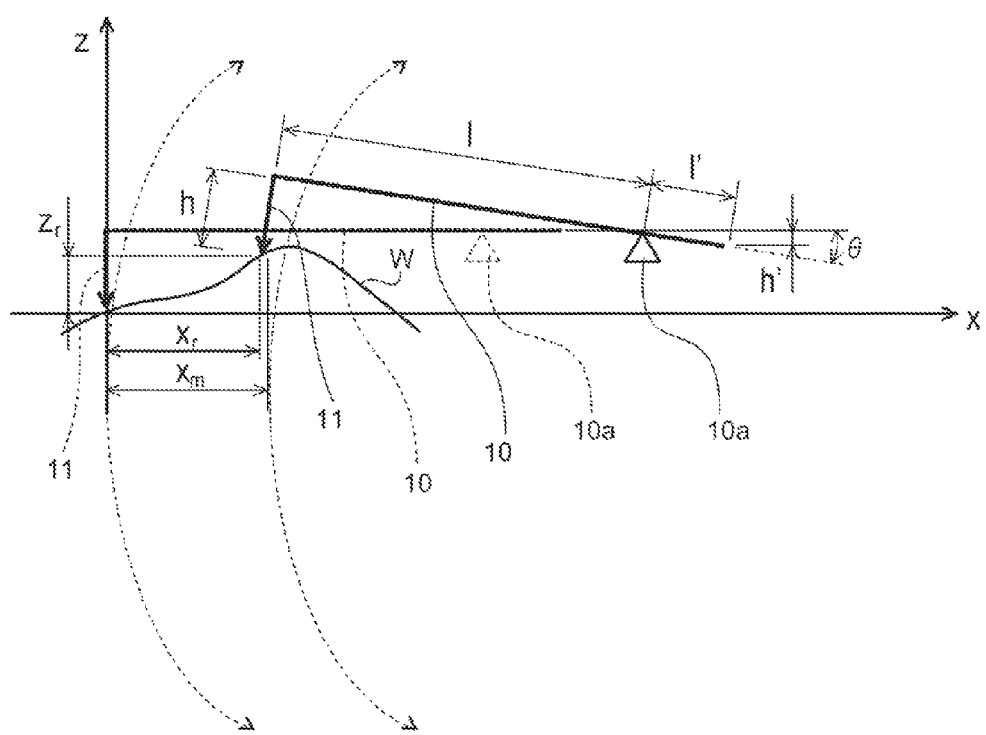
FIG. 4 is a figure geometrically illustrating a pickup mechanism of a pivot-type stylus.

FIG. 4 is a figure geometrically illustrating a pickup mechanism of a pivot-type stylus.

In the pickup mechanism using the pivot-type stylus 10, it is necessary to correct the measurement value in view of the arc motion of the stylus 10.

Where the coordinate in the X axis direction and the coordinate in the Z axis direction of the measurement data obtained using the pickup mechanism of the pivot-type stylus 10 are defined as $(x_m, z_m)$, correct measurement position $(x_r, z_r)$ can be derived from the following expressions 1 and 2.

$$x_r = x_m + l \cdot \left\{ 1 - \sqrt{1 - \left(\frac{g \cdot z_m}{l}\right)^2} \right\} - h \cdot \frac{g \cdot z_m}{l} \quad \text{[Expression 1]}$$

$$z_r = g \cdot z_m + h \cdot \left\{ 1 - \sqrt{1 - \left(\frac{g \cdot z_m}{l}\right)^2} \right\} \quad \text{[Expression 2]}$$

In the expression 1 and the expression 2, g denotes a gain coefficient, l denotes a length from the fulcrum 10a of the stylus 10 to the end of the arm (arm length), and h denotes a length from the end of the arm of the stylus 10 to the measurement piece 11 (edge length) (see FIG. 4).

In this specific example, the expression 1 and the expression 2 are used as the model expressions, and the gain coefficient g, the arm length l, and the edge length h are adopted as the parameters, and the fitting of the parameters are performed from a relationship between the design data DT and the correction values based on the model expressions of the reference measurement values.

More specifically, first, the pivot-type stylus 10 measures the surface of the master work piece, and obtains the reference measurement value $(x_k^m, z_k^m)$. In this case, k is 1, 2, ..., n. Subsequently, the reference measurement values $(x_k^m, z_k^m)$ are corrected by the expression 1 and the expression 2. Then, the design data DT and the correction values obtained from the correction are position-adjusted (best fitting) in the X axis direction, the shortest distance after the best fitting (or the difference of coordinate value in the Z axis direction) is adopted as the evaluation amount, and each of the parameters (the gain coefficient g, and the arm length l, and the edge length h) is estimated so that, for example, the sum of squares of the residual error becomes the minimum.

When the measurement values of the measurement target work piece are corrected by using the expression 1 and the expression 2 in which the parameters are estimated, the corrected measurement values reflecting the calibration data obtained from the measurement of the master work piece can be obtained. As described above, the calibration data can be included in the model expression by fitting each of the parameters of the model expressions based on the arc motion of the pivot-type stylus 10. Therefore, when the measurement values of the measurement target work piece made from the same design data DT as the master work piece used to obtain the calibration data are corrected with the model expressions, the correction based on the optimum calibration data can be performed.

Although not explained in the above, correction including the end shape of the measurement piece 11 provided at the end of the stylus 10 may be performed. For example, a technique described in Japanese Patent No. 4372759 may be applied to the correction of the end shape of the measurement piece 11.

[Measurement Value Correction Program]

Subsequently, the measurement value correction program will be explained.

The measurement value correction method explained above may be achieved by a measurement value correction program executed by the CPU 31 of the computer 30.

Figure 5:
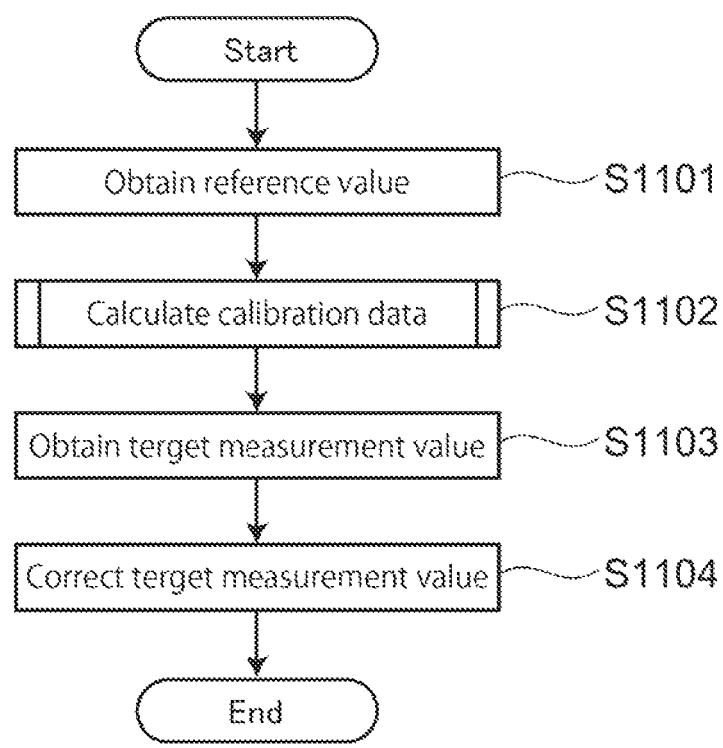
FIG. 5 is a flowchart illustrating an example of a main routine of a measurement value correction program.
Figure 6:
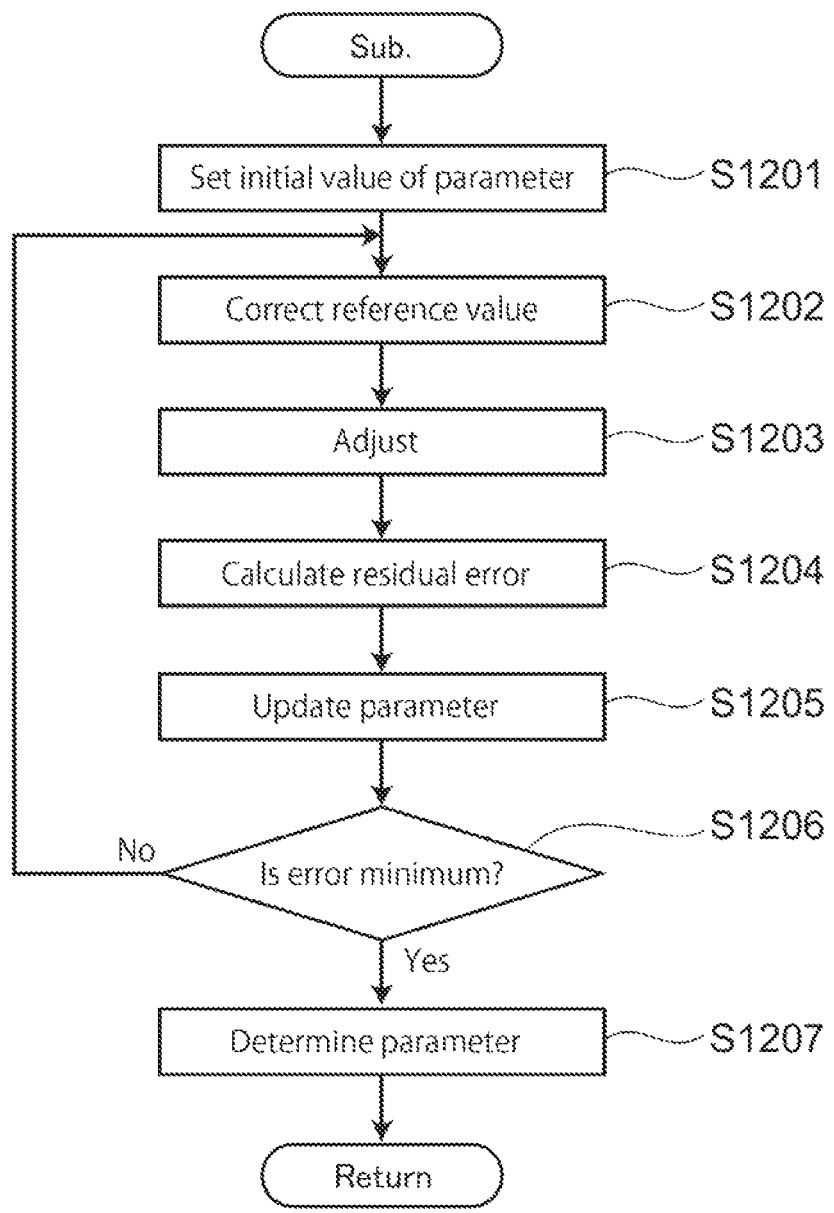
FIG. 6 is a flowchart illustrating an example of a subroutine of a measurement value correction program.

FIGS. 5 and 6 are flowcharts illustrating an example of a measurement value correction program.

First, as shown in step S1101 of FIG. 5, the reference measurement value is obtained. More specifically, the computer 30 executes processing for adopting one of the multiple work pieces W1, W2, W3, ..., Wn made from the same design data DT as the master work piece and obtaining the measurement value (reference measurement value) of the master work piece measured with the stylus 10.

Subsequently, as shown in step S1102, the calibration data are calculated. The computer 30 executes processing for calculating the calibration data on the basis of the difference between the design data DT of the master work piece and the reference measurement value obtained in advance. This processing is performed by a subroutine as shown in FIG. 6.

First, as shown in step S1201 in FIG. 6, processing for setting initial values of parameters is performed. For example, in a case where the expression 1 and the expression 2 are adopted as the model expressions, and this gain coefficient g, the arm length l, and the edge length h are adopted as the parameters, geometric values along the design values of the stylus 10 are set as the initial values for these parameters.

Subsequently, as shown in step S1202, the reference measurement value is corrected. More specifically, the correction value is calculated by correcting the measurement value of the master work piece obtained in step S1101 (reference measurement value) with the expression 1 and the expression 2.

Subsequently, as shown in step S1203, the correction value and the design data DT are position-adjusted. In this position-adjustment, the design data DT and the correction value of the reference measurement value based on the master work piece are position-adjusted (best fitting) in the X axis direction. For example, depending on the shape of the measurement piece 11 of the stylus 10 (such as a spherical body and the like), the coordinate value of the reference measurement value in the X axis direction needs to be corrected in accordance with the shape of the measurement piece 11. This correction is the position-adjustment (best fitting).

Subsequently, as shown in step S1204, the residual error calculation is performed. The residual error calculation is processing for deriving, as the residual error, the shortest distance (or the difference of the coordinate value in the Z axis direction) between the design data DT and the correction value after the best fitting.

Subsequently, as shown in step S1205, the parameter is updated. In this case, processing is performed to change the parameters of the model expressions so that the residual error derived in step S1204 in advance is reduced. For example, where the expression 1 and the expression 2 are the model expressions, processing is performed to adjust the gain coefficient g, the arm length l, and the edge length h.

Subsequently, as shown in step S1206, a determination is made as to whether the residual error is the minimum or not. More specifically, after the parameters are adjusted in step S1205, the residual error is derived again. Then, in a case where the residual error is not the minimum, the processing in step S1202 to step S1205 is repeated. The determination as to whether the residual error is the minimum or not may be made by, for example, determining whether the residual error is within a range set in advance. In a case where the residual error is the minimum, the parameter is determined as shown in step S1207.

Subsequently, step S1103 in FIG. 5 is performed. In step S1103, the target measurement value is obtained. More specifically, processing is executed to adopt a work piece other than the master work piece among the multiple work pieces W1, W2, W3, . . . , Wn made from the same design data DT as the measurement target work piece, and obtaining the target measurement value obtained by measuring the surface of this measurement target work piece with the stylus 10.

Subsequently, as shown in step S1104, the target measurement value is corrected. In this case, processing is performed to correct the target measurement value with the model expressions using the parameters determined in the subroutine shown in FIG. 6, and obtain the corrected measurement value.

According to such measurement value correction program, the calibration data are obtained by adopting one of the multiple work pieces W1, W2, W3, . . . , Wn made from the same design data DT as the master work piece, and the calibration data can be reflected in the model expressions. Accordingly, a measurement result based on the correction optimum for the shape of the measurement target work piece made from the same design data DT as the master work piece can be calculated by the computer 30.

In the fitting of the parameters in the measurement value correction program, some of multiple parameters of which sensitivity to the position accuracy is low may be excluded from the target of fitting.

Figure 7A:
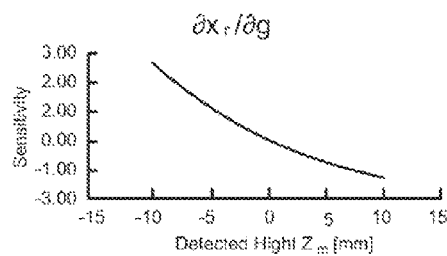
FIGS. 7A to 7F are figures illustrating sensitivity curves of parameters with respect to detection positions.
Figure 7B:
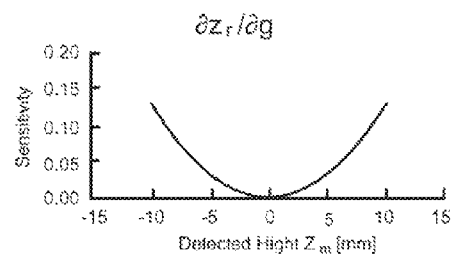
Figure 7C:
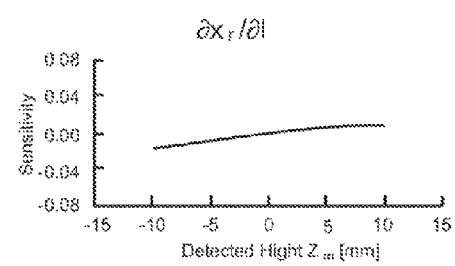
Figure 7D:
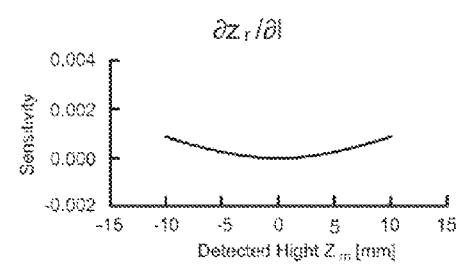
Figure 7E:
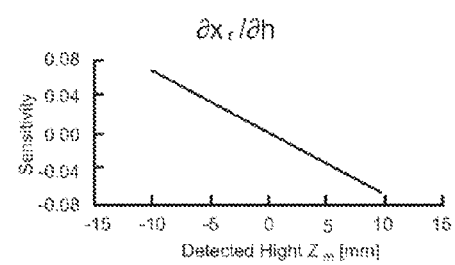
Figure 7F:
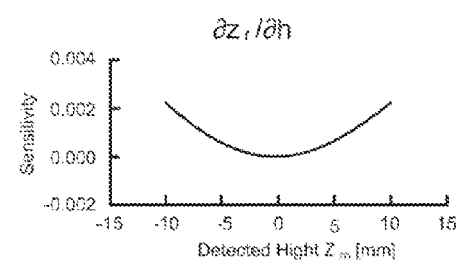

FIGS. 7A to 7F are figures illustrating sensitivity curves of parameters according to the detection positions, and FIG. 7A, FIG. 7C, and FIG. 7E are sensitivity curves of parameters according to the detection positions in the X axis direction, and FIG. 7B, FIG. 7D, and FIG. 7F are sensitivity curves of parameters according to the detection positions in the Z axis direction.

FIG. 7A illustrates a coordinate change (differential value) of the gain coefficient g in the X axis direction, and FIG. 7B illustrates a coordinate change (differential value) of the gain coefficient g in the Z axis direction. FIG. 7C illustrates a coordinate change (differential value) of the arm length l in the X axis direction, and FIG. 7D illustrates a coordinate change (differential value) of the arm length l in the Z axis direction. FIG. 7E illustrates a coordinate change (differential value) of the edge length h in the X axis direction, and FIG. 7F illustrates a coordinate change (differential value) of the edge length h in the Z axis direction.

When the sensitivity curves of the parameters as shown in FIGS. 7A to 7F are referred to, it is understood that the sensitivity of the arm length l among the gain coefficient g, the arm length l, and the edge length h is the lowest. Therefore, when the parameters are fitted, exclusion of the arm length l would have less effect. As described above, when a parameter of which sensitivity is low is excluded from the target of fitting (fixed), the convergence time required in the optimization processing of the parameters can be reduced.

The measurement value correction program explained above may be recorded to a computer-readable memory medium MM, or may be distributed via a network.

In the measurement of the target object, it is necessary to provide a reference sphere having sphericity in the order of at least several nanometers in order to withstand the production evaluation in the order of several dozen nanometers, but it is not easy to obtain such a reference sphere. Even if such a reference sphere can be obtained, it is extremely expensive, and it is not practical to provide it as a product. The calibration using the spherical surface is a calibration optimum for a work piece of a spherical surface, and there is a problem in that, in a case where the work piece is other than a spherical surface (for example, an aspherical surface), the calibration accuracy is reduced. According to the present embodiment, a correction optimum for the shape of the work piece, which is to be measured, can be performed.

Second Embodiment

Measurement Device

A configuration of a measurement device according to the second embodiment is the same as the configuration shown in FIGS. 1A and 1B for example.

Figure 8:
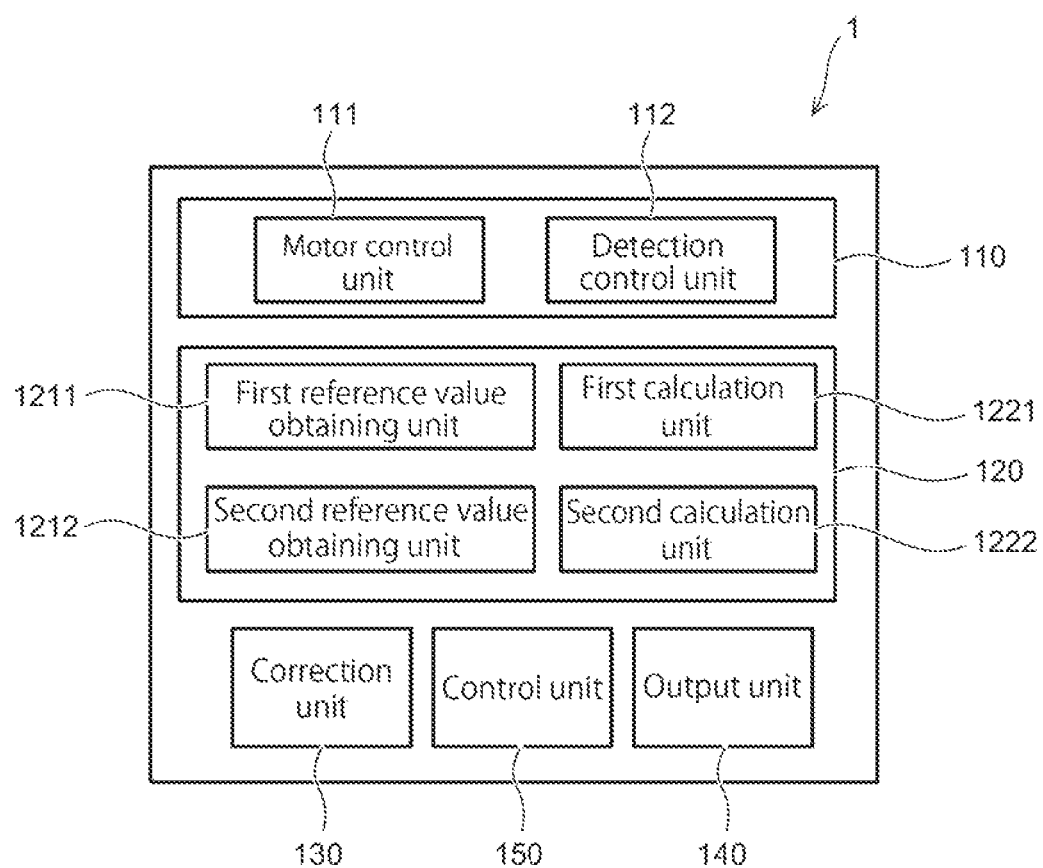
FIG. 8 is a functional block diagram illustrating a measurement device according to the present embodiment.

FIG. 8 is a functional block diagram illustrating a measurement device according to the present embodiment.

The functional blocks of the measurement device 1 include a measurement unit 110, a calibration data obtaining unit 120, a correction unit 130, an output unit 140, and a control unit 150. Among them, the measurement unit 110 includes a motor control unit 111 and a detection control unit 112. The calibration data obtaining unit 120 includes a first reference value obtaining unit 1211, a second reference value obtaining unit 1212, a first calculation unit 1221, and a second calculation unit 1222.

The motor control unit 111 of the measurement unit 110 gives a command for controlling the rotation of the motor 21. The detection control unit 112 controls the X axis detection unit 22 and the Z axis detection unit 23, and obtains the coordinate value in the X axis and the coordinate value in the Z axis (measurement values) sent therefrom.

The calibration data obtaining unit 120 is a portion for obtaining the calibration data for correcting the measurement value obtained by the measurement unit 110. The first reference value obtaining unit 1211 of the calibration data obtaining unit 120 adopts one of the multiple work pieces W made from the same design data as the master work piece, and obtains a first reference measurement value obtained by measuring the surface of the master work piece with the stylus 10.

The second reference value obtaining unit 1212 of the calibration data obtaining unit 120 obtains a second reference measurement value obtained by measuring the surface of the same master work piece as the above with another measurement device. In this case, a measurement device that has a higher degree of measurement accuracy than the measurement device 1 according to the present embodiment and that has already been calibrated is used as the another measurement device, The first calculation unit 1221 of the calibration data obtaining unit 120 calculates the calibration data on the basis of a difference of the design data and the first reference measurement value obtained by the first reference value obtaining unit 1211. The second calculation unit 1222 calculates difference data which are a difference between the value obtained by correcting the first reference measurement value using the calibration data calculated by the first calculation unit 1221 and the second reference measurement value obtained by the second reference value obtaining unit 1212.

The correction unit 130 is a portion for correcting the measurement value obtained by the measurement unit 110 with the calibration data obtained by the calculation with the first calculation unit 1221, subtracting the difference data calculated by the second calculation unit 1222 from the corrected value to obtain the corrected measurement value.

The output unit 140 is a portion for outputting a measurement result. The control unit 150 is a portion for controlling the measurement unit 110, the calibration data obtaining unit 120, the correction unit 130, and the output unit 140.

The measurement device 1 having such functional blocks can correct the measurement value of the surface of the work piece W with the calibration data, and obtain a measurement result involving less error. In particular, the reference measurement value is obtained by adopting one of the multiple work pieces W made from the same design data as the master work piece, and therefore, the calibration data optimum for the shape of another work piece W made from the same design data as the master work piece can be obtained. Further, the master work piece is measured by another measurement device of which measurement is more highly accurate than the measurement device 1 according to the present embodiment, and the difference data from the measurement correction value of the master work piece provided by the measurement device 1 is obtained, and therefore, the measurement can be performed with the same level of measurement accuracy as the highly accurate another measurement device by removing the error provided by the measurement device 1.

[Measurement Value Correction Method]

Subsequently, a correction method of a measurement value including acquisition of the calibration data will be explained.

In this case, for example, a method for correcting a measurement value by using the measurement device 1 will be explained.

Figure 9A:
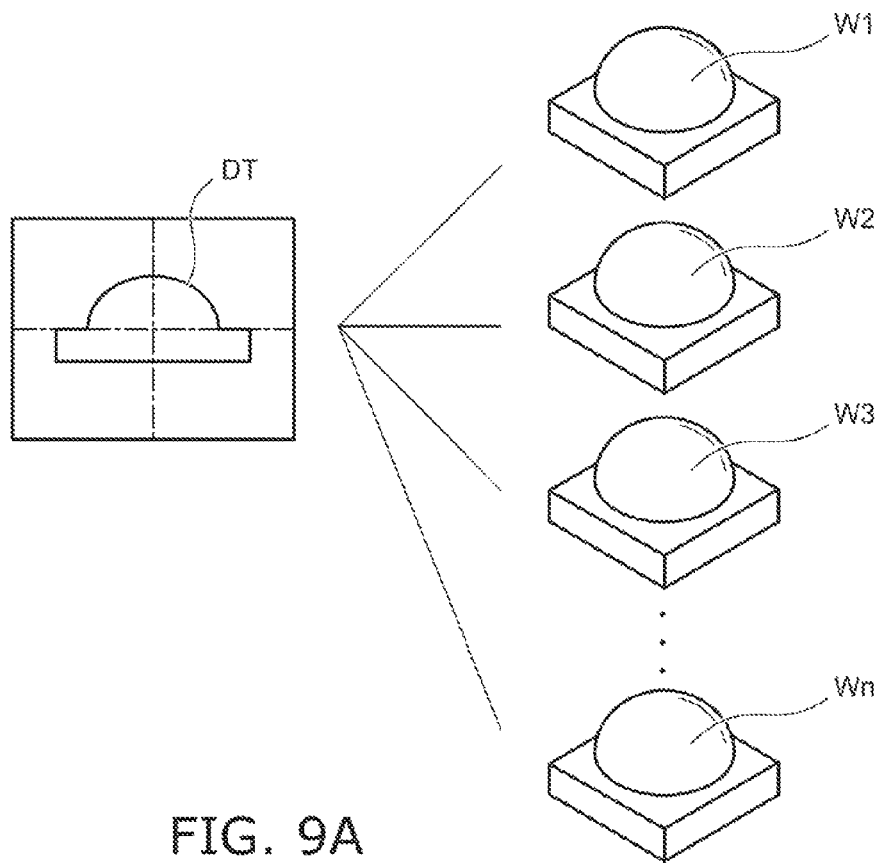
FIGS. 9A and 9B are figures explaining a measurement value correction method according to the present embodiment.

First, as shown in FIG. 9A, the multiple work pieces W1, W2, W3, . . . , Wn made from the same design data DT are prepared. Subsequently, one of the multiple made work pieces W1, W2, W3, . . . , Wn is adopted as the master work piece. In this case, for example, the work piece W1 is adopted as the master work piece. Then, the measurement unit 110 of the measurement device 1 measures the surface of the master work piece, and obtains the first reference measurement value. The first reference measurement value is obtained by the first reference value obtaining unit 1211.

Figure 9B:
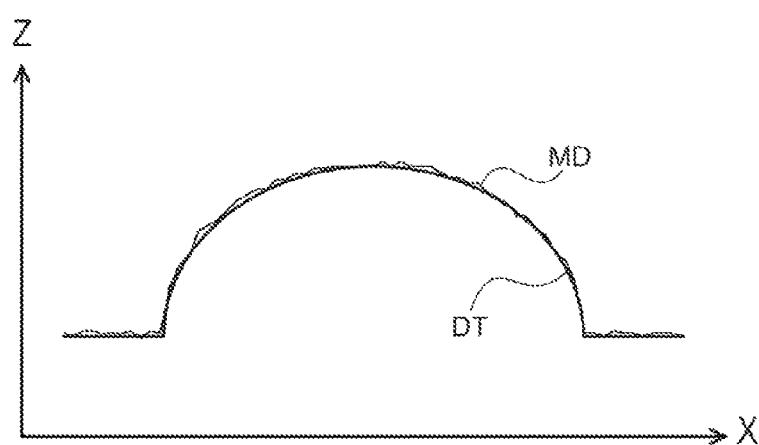

Subsequently, the calibration data are obtained on the basis of the difference between the first reference measurement value and the design data DT. The calibration data are calculated by the first calculation unit 1221 of the calibration data obtaining unit 120. FIG. 9B is a figure illustrating an example of a difference between the design data DT and the measurement value MD of the master work piece. In FIG. 9B, the horizontal axis represents a coordinate in the X axis direction, the vertical axis is a coordinate in the Z axis direction. The measurement values MD of the master work piece are obtained as the Z axis coordinates respectively corresponding to multiple X axis coordinates. The first calculation unit 1221 derives a difference between the value of each measurement value MD in the Z axis coordinate and the Z axis coordinate of the design data DT corresponding to the measurement value MD in question, and calculates parameters of the model function by, for example, least-square method. The parameters of this model function are the calibration data.

Subsequently, another measurement device of which measurement accuracy is higher than the measurement device 1 measures the surface of the same master work piece as the above, and obtains the second reference measurement value. The second reference measurement value is obtained by the second reference value obtaining unit 1212. The measurement of the master work piece with another measurement device may be performed once.

Subsequently, difference data which are a difference between the value obtained by correcting the first reference measurement value using the calibration data and the second reference measurement value is obtained. The difference data is calculated by the second calculation unit 1222 of the calibration data obtaining unit 120. The difference data includes measurement errors of the measurement device 1 and the another measurement device of which measurement accuracy is higher than the measurement device 1.

Subsequently, the measurement unit 110 adopts the work pieces W2, W3, . . . , Wn of the multiple work pieces W1, W2, W3, . . . , Wn other than the master work piece as the measurement target work piece, and obtains the measurement value of the measurement target work piece (target measurement value) with the stylus 10.

Subsequently, the correction unit 130 corrects the target measurement value by using the calibration data. More specifically, a measurement value having been corrected is derived with the model functions applied with the parameters derived in advance from the coordinate value of the target measurement value in the Z axis direction. Further, the corrected measurement value is obtained by subtracting the difference data from the measurement value having been corrected. This corrected measurement value is the measurement result of the measurement device 1. In such measurement value correction method, this corrected measurement value is derived from the correction with the calibration data derived from the master work piece made from the same design data DT, and is therefore the highly accurate measurement result with the calibration data optimum for the shape of the measurement target work piece. Further, when the correction is performed with the difference data after the target measurement value is corrected by using the calibration data, even a measurement value provided by the measurement device 1 can provide a measurement result having the same degree of accuracy as that obtained from a measurement with another measurement device of which measurement accuracy is high.

In this case, in a case where the design data DT of the work piece W are of, for example, a spherical surface, the calibration data are obtained by adopting one of the multiple work pieces W1, W2, W3, . . . , Wn made from the design data DT as the master work piece, and the measurement value of the measurement target work piece other than the master work piece made from the same design data DT is corrected with the calibration data. The measurement target work piece and the master work piece are made from the same design data DT, and therefore, the calibration data derived from the master work piece are calibration data that are optimum also for the measurement target work piece made from the same design data DT.

Further, another measurement device of which measurement accuracy is higher than the measurement device 1 obtains the second reference measurement value, and the difference data from the correction measurement value of the measurement device 1 are obtained, and therefore, the error caused by the measurement device 1 can be removed, and even the measurement device 1 can perform the measurement with the same degree of accuracy as the another measurement device.

The present embodiment is particularly effective in a case where the design data DT is of an aspherical surface. More specifically, in a case where the design data DT is of an aspherical surface, in general, a highly accurate spherical surface master work piece is used to obtain the calibration data and the difference data. However, it is difficult to prepare a highly accurate spherical surface master work piece. With regard to this point, in the present embodiment, one of the multiple work pieces W1, W2, W3, . . . , Wn made from the design data DT of the same aspherical surface is used as the master work piece, and therefore, it is not necessary to separately prepare a highly accurate spherical surface master work piece. One of the multiple work pieces W1, W2, W3, . . . , Wn made from the design data DT of the same aspherical surface is adopted as the master work piece, and the calibration data and the difference data are obtained, and therefore, a highly accurate measurement result can be obtained from the correction with the calibration data and the difference data optimum for the measurement target work piece.

When the master work piece is selected from the multiple work pieces W1, W2, W3, . . . , Wn made from the same design data DT of the aspherical surface, one of the multiple work pieces W1, W2, W3, . . . , Wn that has the minimum error with respect to the design data DT is the minimum is preferably adopted as the master work piece. Accordingly, more highly accurate correction can be performed.

[Pivot-Type Stylus]

In the present embodiment, the specific acquisition of the calibration data in the measurement device 1 using the pivot-type stylus 10 is the same as the first embodiment (see FIG. 4).

[Measurement Value Correction Program]

Subsequently, a measurement value correction program will be explained.

The measurement value correction method explained above may be achieved by the measurement value correction program executed by the CPU 31 of the computer 30.

Figure 10:
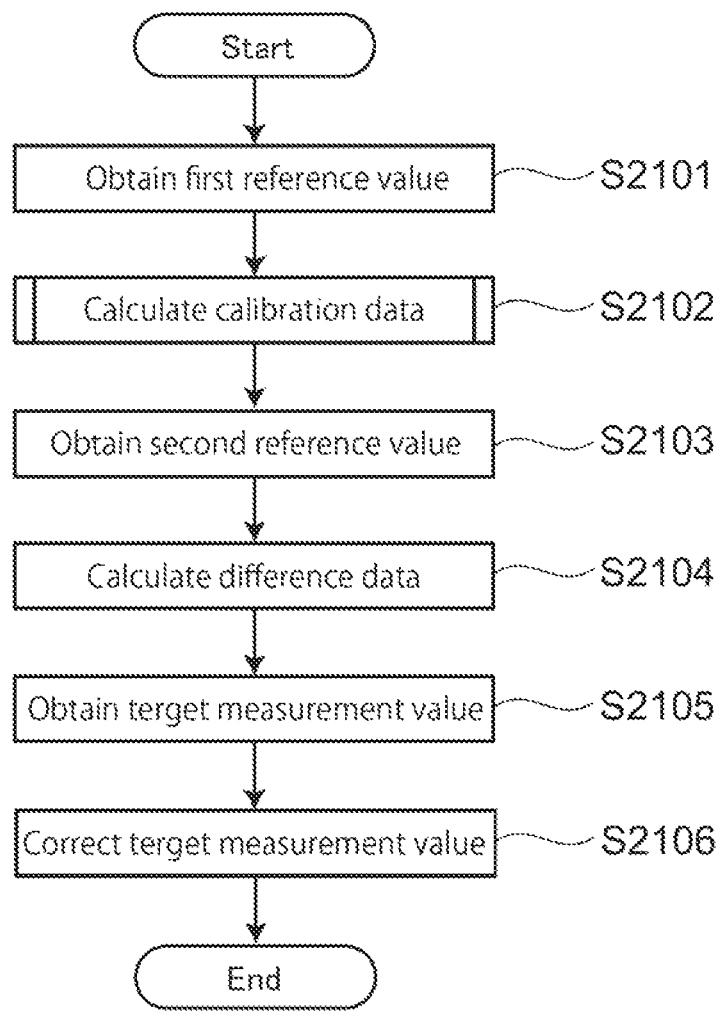
FIG. 10 is a flowchart illustrating an example of a main routine of a measurement value correction program.
Figure 11:
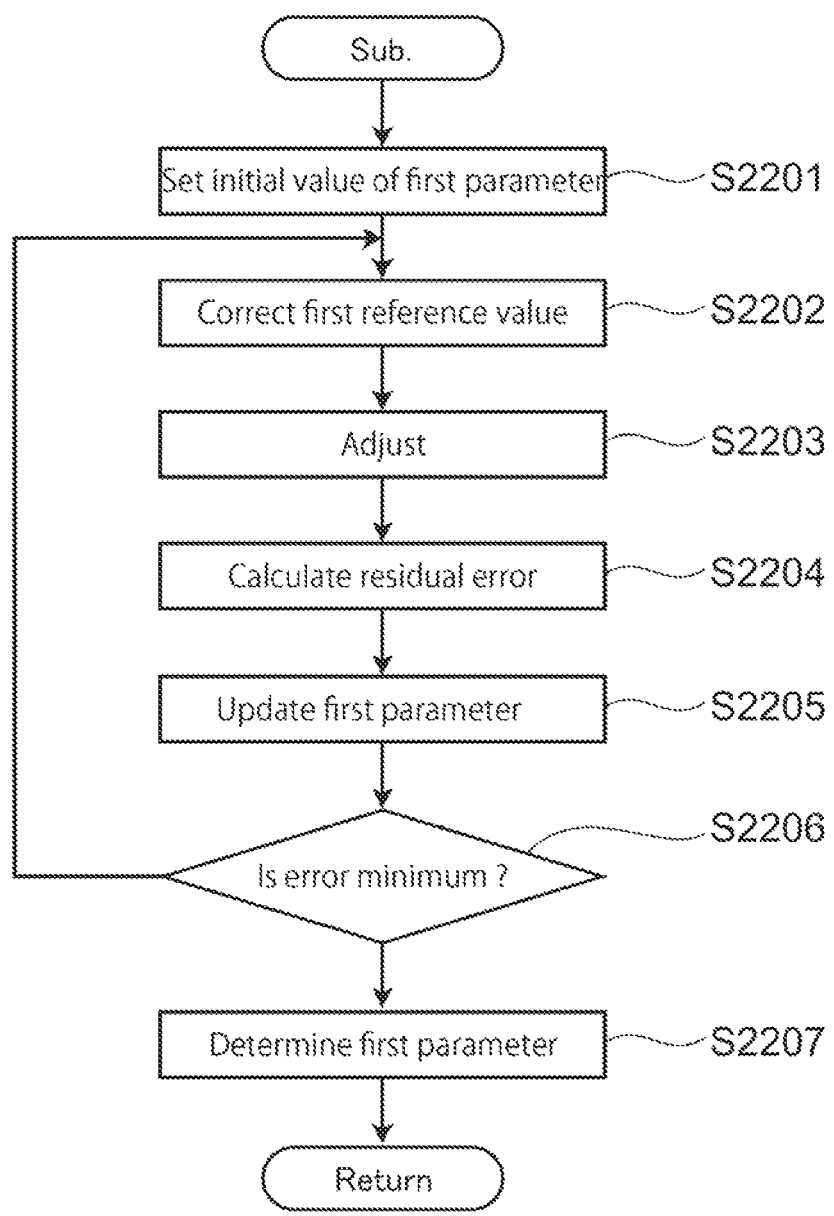
FIG. 11 is a flowchart illustrating an example of a subroutine of a measurement value correction program.

FIGS. 10 and 11 are flowcharts illustrating an example of the measurement value correction program.

First, as shown in step S2101 in FIG. 10, the first reference measurement value is obtained. More specifically, computer 30 executes processing for adopting one of the multiple work pieces W1, W2, W3, . . . , Wn made from the same design data DT as the master work piece, and obtaining the measurement value of the master work piece measured with the stylus 10 (first reference measurement value).

Subsequently, as shown in step S2102, the calibration data are calculated. The computer 30 executes processing for calculating the calibration data on the basis of the difference between the design data DT of the master work piece and the first reference measurement value obtained in advance. This processing is performed by a subroutine as shown in FIG. 11.

First, as shown in step S2201 in FIG. 11, processing is performed to set the initial value of the first parameter. For example, in a case where the expression 1 and the expression 2 are adopted as the model expressions, and this gain coefficient g, the arm length l, and the edge length h are adopted as the parameters, geometric values along the design values of the stylus 10 are set as the initial values for these parameters (first parameters).

Subsequently, as shown in step S2202, the first reference measurement value is corrected. More specifically, the correction value is calculated by correcting the measurement value of the master work piece obtained in step S2101 (the first reference measurement value) with the expression 1 and the expression 2.

Subsequently, as shown in step S2203, the correction value and the design data DT are position-adjusted. In this position-adjustment, the design data DT and the correction value of the first reference measurement value based on the master work piece are position-adjusted (best fitting) in the X axis direction. For example, depending on the shape of the measurement piece 11 of the stylus 10 (such as a spherical body and the like), the coordinate value of the first reference measurement value in the X axis direction needs to be corrected in accordance with the shape of the measurement piece 11. This correction is the position-adjustment (best fitting).

Subsequently, as shown in step S2204, the residual error calculation is performed. The residual error calculation is processing for deriving, as the residual error, the shortest distance (or the difference of the coordinate value in the Z axis direction) between the design data DT and the correction value after the best fitting.

Subsequently, as shown in step S2205, the first parameter is updated. In this case, processing is performed to change the parameters of the model expressions (first parameter) so that the residual error derived in step S2204 in advance is reduced. For example, where the expression 1 and the expression 2 are the model expressions, processing is performed to adjust the gain coefficient g, the arm length l, and the edge length h.

Subsequently, as shown in step S2206, a determination is made as to whether the residual error is the minimum or not. More specifically, after the first parameters are adjusted in step S2205, the residual error is derived again. Then, in a case where the residual error is not the minimum, the processing in step S2202 to step S2205 is repeated. The determination as to whether the residual error is the minimum or not may be made by, for example, determining whether the residual error is within a range set in advance. In a case where the residual error is the minimum, the first parameter is determined as shown in step S2207.

Subsequently, step S2103 in FIG. 10 is performed. In step S2103, the second reference measurement value is obtained. In this case, the same master work piece as the above is measured by another measurement device of which measurement accuracy is higher than the measurement device 1, and the second reference measurement value is obtained. In a case where the master work piece is already measured, and the measurement result thereof is stored in a memory, or in a case where the master work piece is measured with another measurement device, and the measurement result thereof is stored in a memory, the measurement result stored in the memory may be read as the second reference measurement value.

Subsequently, as shown in step S2104, the difference data are calculated. The computer 30 executes processing for calculating the difference data which is the difference between the value obtained by correcting the first reference measurement value by using the calibration data derived in step S2102 and the second reference measurement value derived in step S2103.

Subsequently, as shown in step S2105, the target measurement value is obtained. More specifically, processing is performed to adopt one of the multiple work pieces W1, W2, W3, . . . , Wn made from the same design data DT other than the master work piece as the measurement target work piece, and obtain the target measurement value obtained by measuring the surface of measurement target work piece with the stylus 10 of the measurement device 1.

Subsequently, as shown in step S2106, the target measurement value is corrected. In this case, processing is performed to correct the target measurement value with the model expressions applied with the calibration data calculated in step S2102 (first parameter), and subtracting the difference data derived in step S2104 from the corrected value, thus deriving the corrected measurement value.

According to such measurement value correction program, the calibration data are obtained by adopting one of the multiple work pieces W1, W2, W3, . . . , Wn made from the same design data DT as the master work piece, and the calibration data can be reflected in the model expressions. Accordingly, a measurement result based on the correction optimum for the shape of the measurement target work piece made from the same design data DT as the master work piece can be calculated by the computer 30.

Further, the corrected measurement value is obtained by subtracting the difference data from the value corrected with the calibration data, and therefore, the error component of the measurement device 1 with respect to another measurement device of which measurement accuracy is high can be eliminated, and even the measurement device 1 can perform highly accurate measurement.

Like the first embodiment, in the fitting of the parameters in the measurement value correction program (first parameter), some of multiple parameters of which sensitivity to the position accuracy is low may be excluded from the target of fitting (see FIGS. 7A to 7F).

The measurement value correction program explained above may be recorded to a computer-readable memory medium MM, or may be distributed via a network.

In the measurement of the target object, it is necessary to have a measurement device having a high degree of accuracy in the order of at least several nanometers in order to withstand the production evaluation in the order of several dozen nanometers, but it is not easy to obtain such a reference sphere. Such a measurement device requires a long measurement time, and is extremely expensive and is difficult to be obtained. In addition, it is troublesome to perform maintenance in order to keep a high degree of accuracy, and it is not practical to use such a measurement device at all times in a production line and the like. According to the present embodiment, a highly accurate measurement result can be obtained with the correction optimum for the measurement value.

As described above, according to the measurement value correction method, the computer-readable recording medium storing the measurement value correction program, and the measurement device 1 according to the embodiments, a highly accurate measurement result can be obtained with the correction optimum for the measurement value.

The present embodiments and the specific examples thereof have been hereinabove explained, but the present invention is not limited thereto. For example, in the present embodiment, the measurement device 1 and the measurement method using the pivot-type stylus 10 are used as examples, but the present embodiment can also be applied to a measurement device 1 and a measurement method using a stylus 10 other than the pivot-type. A model expression suitable for the mechanism of the stylus 10 may be used as the model expression of the correction. Embodiments which a person skilled in the art made by adding and deleting a constituent element and changing the design, as necessary, with respect to the above embodiments and the specific examples thereof and embodiments made by combining the features of the embodiments as necessary are included in the scope of the present invention as long as the embodiments have the gist of the present invention.

INDUSTRIAL APPLICABILITY

As described above, the present invention is preferably applied to a measurement device measuring the surface shape of the work piece W shape, a height measurement device measuring a surface height, a surface roughness measurement device, and the like.

What is claimed is:
1. A measurement value correction method for correcting a measurement value obtained by tracing a surface of a work piece with a stylus,
the measurement value correction method comprising:
a step of preparing a plurality of work pieces made from same design data;
a step of adopting one of the work pieces as a master work piece and obtaining a reference measurement value with the stylus;
a step of obtaining calibration data based on a difference between the reference measurement value and the design data;
a step of adopting one of the plurality of work pieces other than the master work piece as a measurement target work piece and obtaining a target measurement value with the stylus; and
a step of obtaining a corrected measurement value by correcting the target measurement value by using the calibration data.
2. The measurement value correction method according to claim 1, wherein the stylus is a pivot-type making an arc motion about a fulcrum.
3. The measurement value correction method according to claim 1, wherein a surface of the work piece is an aspherical surface.

4. The measurement value correction method according to claim 1, wherein in the step of obtaining the calibration data, a parameter of a model expression for correcting a measurement value with the stylus is fitted from a relationship between the design data and a correction value for the reference measurement value based on the model expression, and in the step of obtaining the corrected measurement value, the corrected measurement value is obtained by correcting the target measurement value by using the model expression in which the parameter is fitted.

5. A non-transitory computer-readable recording medium storing a program, wherein the program is a measurement value correction program for correcting a measurement value obtained by tracing a surface of a work piece with a stylus, wherein the program causes a computer to function as:

means of obtaining a reference measurement value obtained by measuring, with the stylus, one of a plurality of work pieces made from same design data as a master work piece;

means of calculating calibration data based on a difference between the reference measurement value and the design data;

means of adopting one of the plurality of work pieces other than the master work piece as a measurement target work piece, and obtaining a target measurement value obtained by measuring the measurement target work piece with the stylus; and means of calculating a corrected measurement value by correcting the target measurement value by using the calibration data.

6. The computer-readable recording medium according to claim 5, wherein the stylus is a pivot-type making an arc motion about a fulcrum.

7. The computer-readable recording medium according to claim 5, wherein a surface of the work piece is an aspherical surface.

8. The computer-readable recording medium according to claim 5, wherein in the means of obtaining the calibration data, a parameter of a model expression for correcting a measurement value with the stylus is fitted from a relationship between the design data and a correction value for the reference measurement value based on the model expression, and in the means of obtaining the corrected measurement value, the corrected measurement value is obtained by correcting the target measurement value by using the model expression in which the parameter is fitted.

9. A measurement device comprising:

a measurement unit configured to obtain a measurement value obtained by tracing a surface of a work piece with a stylus;

a calibration data obtaining unit configured to obtain calibration data; and a correction unit configured to correct the measurement value obtained by the measurement unit with the calibration data, wherein the calibration data obtaining unit includes:

a reference value obtaining unit configured to adopt one of a plurality of work pieces made from same design data as a master work piece and obtaining a reference measurement value with the stylus; and a calculation unit configured to calculate the calibration data on the basis of a difference between the reference measurement value obtained by the reference value obtaining unit and the design data, and wherein the correction unit uses the calibration data to correct a target measurement value obtained by adopting one of the plurality of work pieces other than the master work piece as a measurement target work piece and measuring the measurement target work piece with the stylus.

10. The measurement device according to claim 9, wherein the stylus is a pivot-type making an arc motion about a fulcrum.

11. The measurement device according to claim 9, wherein a surface of the work piece is an aspherical surface.

12. The measurement device according to claim 9, wherein the calculation unit fits a parameter of a model expression for correcting a measurement value with the stylus from a relationship between the design data and a correction value for the reference measurement value based on the model expression, and the correction unit corrects the target measurement value by using the model expression in which the parameter is fitted.

13. A measurement value correction method for correcting a measurement value obtained by tracing a surface of a work piece with a stylus of a measurement device, the measurement value correction method comprising:

a step of preparing a plurality of work pieces made from same design data;

a step of adopting one of the plurality of work pieces as a master work piece and causing a first measurement device to measure the master work piece to obtain a first reference measurement value;

a step of obtaining calibration data based on a difference between the first reference measurement value and the design data;

a step of causing a second measurement device of which measurement accuracy is higher than the first measurement device to measure the master work piece to obtain a second reference measurement value;

a step of obtaining difference data which is a difference between a value obtained by correcting the first reference measurement value by using the calibration data and the second reference measurement value;

a step of adopting one of the plurality of work pieces other than the master work piece as a measurement target work piece and causing the first measurement device to measure the measurement target work piece to obtain a target measurement value; and a step of subtracting the difference data from a value obtained by correcting the target measurement value by using the calibration data to obtain a corrected measurement value.

14. The measurement value correction method according to claim 13, wherein the stylus is a pivot-type making an arc motion about a fulcrum.

15. The measurement value correction method according to claim 13, wherein a surface of the work piece is an aspherical surface.

16. The measurement value correction method according to claim 13, wherein in the step of obtaining the calibration data, a parameter of a model expression for correcting a measurement value with the stylus is fitted from a relationship between the design data and a correction value for the first reference measurement value based on the model expression to derive a first parameter, and in the step of obtaining the corrected measurement value, the target measurement value is corrected by using the model expression in which the first parameter is applied.

17. A non-transitory computer-readable recording medium storing a program, wherein the program is a measurement value correction program for correcting a measurement value obtained by tracing a surface of a work piece with a stylus of a measurement device, and
wherein the program causes a computer to function as:
means of adopting one of the plurality of work pieces made from same design data as a master work piece and causing a first measurement device to measure the master work piece to obtain a first reference measurement value;
means of calculating calibration data based on a difference between the first reference measurement value and the design data;
means of obtaining second reference measurement value obtained by causing a second measurement device of which measurement accuracy is higher than the first measurement device to measure the master work piece;
means of obtaining difference data which is a difference between a value obtained by correcting the first reference measurement value by using the calibration data and the second reference measurement value;
means of adopting one of the plurality of work pieces other than the master work piece as a measurement target work piece and causing the first measurement device to measure the measurement target work piece to obtain a target measurement value; and
means of subtracting the difference data from a value obtained by correcting the target measurement value by using the calibration data to obtain a corrected measurement value.

18. The computer-readable recording medium according to claim 17, wherein the stylus is a pivot-type making an arc motion about a fulcrum.

19. The computer-readable recording medium according to claim 17, wherein a surface of the work piece is an aspherical surface.

20. The computer-readable recording medium according to claim 17, wherein in the step of obtaining the calibration data, a parameter of a model expression for correcting a measurement value with the stylus is fitted from a relationship between the design data and a correction value for the first reference measurement value based on the model expression to derive a first parameter, and
in the means of obtaining the corrected measurement value, the target measurement value is corrected by using the model expression in which the first parameter is applied.

21. A measurement device comprising:
a measurement unit configured to obtain a measurement value obtained by tracing a surface of a work piece with a stylus;
a calibration data obtaining unit configured to obtain calibration data; and
a correction unit configured to correct the measurement value obtained by the measurement unit with the calibration data,
wherein the calibration data obtaining unit includes:
a first reference value obtaining unit configured to adopt one of a plurality of work pieces made from same design data as a master work piece and obtaining a first reference measurement value measured by a first measurement device;
a second reference value obtaining unit configured to obtain a second reference measurement value obtained by causing a second measurement device of which measurement accuracy is higher than the first measurement device to measure the master work piece;
a first calculation unit configured to calculate calibration data on the basis of a difference between the first reference measurement value and the design data; and
a second calculation unit configured to calculate difference data which is a difference between a value obtained by correcting the first reference measurement value by using the calibration data and the second reference measurement value,
wherein the correction unit uses the calibration data to correct a target measurement value obtained by adopting one of the plurality of work pieces other than the master work piece as a measurement target work piece and causing the first measurement device to measure the measurement target work piece, and subtracts the difference data from the corrected value to obtain a corrected measurement value.

22. The measurement device according to claim 21, wherein the stylus is a pivot-type making an arc motion about a fulcrum.

23. The measurement device according to claim 21, wherein a surface of the work piece is an aspherical surface.

24. The measurement device according to claim 21, wherein the first calculation unit fits a parameter of a model expression for correcting a measurement value with the stylus from a relationship between the design data and a correction value for the first reference measurement value based on the model expression to derive a first parameter, and
the correction unit corrects the target measurement value by using the model expression in which the first parameter is applied.

* * * * *